United States Patent
Govari et al.

(10) Patent No.: US 12,543,990 B2
(45) Date of Patent: Feb. 10, 2026

(54) METHODS AND SYSTEMS FOR BYPASSING A SIGNAL CONVERTER IN A CARDIAC SENSING AND PACING SYSTEM

(71) Applicant: BIOSENSE WEBSTER (ISRAEL) LTD., Yokneam (IL)

(72) Inventors: Assaf Govari, Haifa (IL); Vadim Gliner, Haifa (IL); Andres Claudio Altmann, Haifa (IL); Alon Boumendil, Haifa (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 397 days.

(21) Appl. No.: 17/565,608

(22) Filed: Dec. 30, 2021

(65) Prior Publication Data
US 2023/0211165 A1 Jul. 6, 2023

(51) Int. Cl.
*A61B 5/304* (2021.01)

(52) U.S. Cl.
CPC .................... *A61B 5/304* (2021.01)

(58) Field of Classification Search
CPC ............ A61N 1/37264; A61N 1/37235; A61N 1/3625; A61N 1/3704; A61N 1/056; A61N 1/37512; A61B 5/308; A61B 18/1492; A61B 5/6852; A61B 5/304; A61B 5/318; A61B 18/12; A61B 5/00; A61B 5/053; A61B 18/14; A61B 34/20; A61B 90/39; A61B 2018/00351; A61B 2018/00577; A61B 2034/2051; A61B 2034/2068; A61M 25/01
See application file for complete search history.

(56) References Cited

U.S. PATENT DOCUMENTS

| | | | |
|---|---|---|---|
| 6,226,542 B1 | 5/2001 | Reisfeld | |
| 6,298,268 B1 | 10/2001 | Ben | |
| 6,301,496 B1 | 10/2001 | Reisfeld | |
| 6,892,091 B1 | 5/2005 | Ben | |
| 7,536,218 B2 | 5/2009 | Govari | |
| 2003/0216630 A1 | 11/2003 | Jersey | |
| 2007/0060832 A1 | 3/2007 | Levin | |
| 2007/0167850 A1 | 7/2007 | Russell | |
| 2012/0109242 A1* | 5/2012 | Levin | A61B 5/304 607/17 |

(Continued)

FOREIGN PATENT DOCUMENTS

EP  3838149 A1  6/2021

OTHER PUBLICATIONS

European Search report for corresponding EPA No. 2217059.9 dated Mar. 2, 2023.

*Primary Examiner* — Eugene T Wu

(57) ABSTRACT

Switching systems are positioned along a bidirectional signal carrying line, typically between an electrode in a catheter at the heart of a patient, and an external console. The switching system provides for switching the bidirectional signal carrying line between: a main line, which carries acquired electrocardiac signals from the electrode of the catheter at the heart of the patent to the external console, via a switch unit; and, a bypass line, which carries pacing signals, directly from the external console to the electrode of the catheter. The bypass line provides an uninterrupted electrical connection between the electrode and the external console, thus avoiding the switch unit.

5 Claims, 6 Drawing Sheets

(56) References Cited

U.S. PATENT DOCUMENTS

2014/0185502 A1 7/2014 Kenney
2019/0254622 A1 8/2019 Al-Ali
2021/0178166 A1* 6/2021 Govari .................. A61B 5/367

* cited by examiner

METHODS AND SYSTEMS FOR BYPASSING A SIGNAL CONVERTER IN A CARDIAC SENSING AND PACING SYSTEM

TECHNICAL FIELD

The present disclosure relates generally to switching systems for signals during cardiac procedures, and particularly to switching systems for switching between acquired electrocardiac signals and pacing signals during cardiac procedures.

BACKGROUND

Electrocardiac signals acquired during a cardiac procedure, such as Electro-Physiological (EP) sensing procedure, are routed from electrodes at the heart of a patient to a system console, where the signals are recorded, analyzed, and displayed. The signals may be routed via a switching system which includes a digital-to-analog converter (DAC), which accepts acquired or "raw" digital signals from the electrodes and converts them into analog signals. The switching system may also perform other functions such as filtering and amplification. This manipulation overcomes the legacy problem that the console is only designed to accept a limited number of acquired signals.

BRIEF DESCRIPTION OF THE DRAWINGS

The present disclosed subject matter will be more fully understood from the following detailed description of the examples thereof, taken together with the drawings, where corresponding or like reference numbers or characters indicate corresponding or like elements, in which.

DETAILED DESCRIPTION OF EXAMPLES

Overview

The present disclosed subject matter provides switching systems and methods for handling the high (and constantly growing) numbers of signals that are acquired over short time periods, e.g., simultaneously, and passed from electrodes at the heart the patient to the console, while allowing pacing to proceed as normal.

The disclosed subject matter provides a switching system which includes a switch unit, which performs operations such as digital to analog signal conversion (by a digital to analog converted (DAC)) and other signal processing operations. The switching system is positioned along a bidirectional signal carrying line, also known as a bidirectional line. The bidirectional line extending between a catheter at the heart, the catheter including, for example, an electrode, and a console. The bidirectional line includes a main line, extending through the switch unit and a bypass line, around the switch unit, the main line and bypass lines enabled and disabled by switches, with the switches at the junctions of the main line and the bypass line. Pacing signals generated in the console cannot pass through the DAC and/or other signal processors of the switch unit, and accordingly, have to travel over the bypass line, which must be enabled by the switches changing states. The enabled bypass line provides an uninterrupted electrical connection from the console to the catheter, allowing for safe operation of the pacing signals.

System Description

Figure 1:
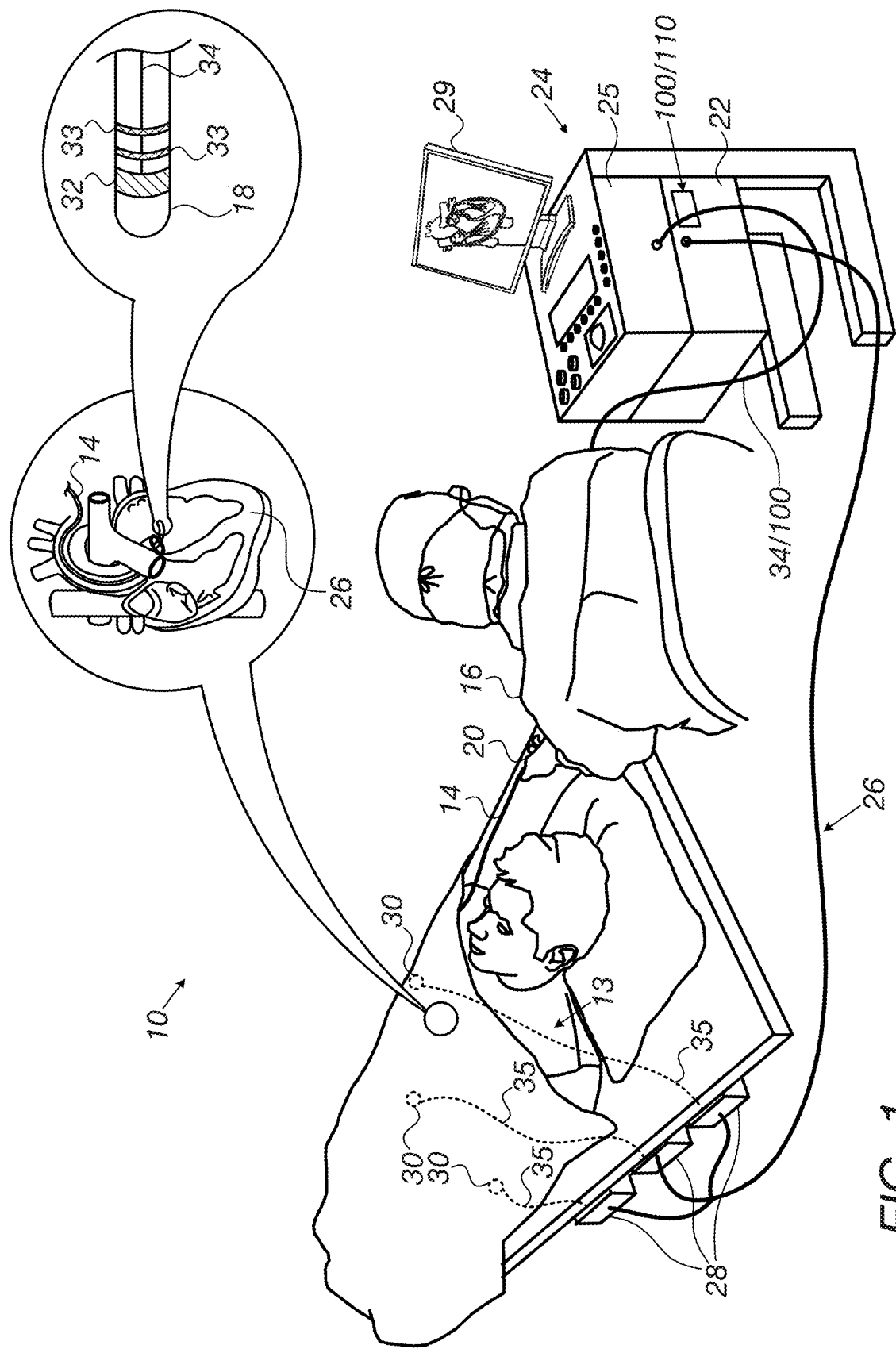
FIG. 1 is a schematic pictorial illustration of a cardiac EP sensing, mapping, pacing and ablation system used with a patient, in accordance with examples of the present disclosure.

FIG. 1 is a pictorial illustration of a system 10 for performing EP sensing, pacing and ablation procedures on a heart 12 of a living subject (e.g., patient 13). The system 10 comprises a catheter 14, which is percutaneously inserted by an operator 16 through the patient's 13 vascular system into a chamber or vascular structure of the heart 12. An operator 16, who is typically a physician, brings the catheter's distal tip 18 into contact with the heart wall.

Electrical activation maps may then be prepared, e.g., according to the methods disclosed in U.S. Pat. Nos. 6,226,542, and 6,301,496, and in commonly assigned U.S. Pat. No. 6,892,091. One commercial product embodying elements of the system 10 is available as the CARTO®3 System, available from Biosense Webster, Inc., 3333 Diamond Canyon Road, Diamond Bar, Calif. 91765.

Areas determined to be abnormal, for example, by evaluation of the electrical activation maps, can be ablated, e.g., by passage of radiofrequency electrical current through wires in the catheter to one or more electrodes at the distal tip 18.

The catheter 14 typically comprises a handle 20, having suitable controls on the handle to enable the operator 16 to steer, position and orient the distal end of the catheter as desired for the ablation. To aid the operator 16, the distal portion of the catheter 14 contains position sensors (not shown) that provide signals to a positioning processor 22, located in a console 24.

Ablation energy and electrical signals can be conveyed to and from the heart 12 through an ablation electrode 32 located at or near the distal tip 18 via cable 34 to the console 24. Sensing electrodes 33, also connected to the console 24, are disposed generally in the distal portion of the catheter 14, and have connections to the cable 34.

Electrocardiac signals, acquired, for example, from the sensing electrodes 33, pass from the electrode 33 through the cable 34, and are digitized by suitable Analog-to-Digital Converters (ADCs), for example of a patient interface unit (PIU) (50), this PIU in communication with the electrodes 33 and is positioned along the cable 34, for example, proximate to the electrodes 33. The resulting digital signals are referred to herein as "acquired electrocardiac signals", "acquired signals", or "raw signals"-these terms used interchangeably herein. The digital signals are provided to the switching system 100, to the switch unit 110, and then to the console 24. While in the switch unit 110, the acquired digital signals are typically subjected to processing, including modification, such as digital to analog conversion, filtering, amplification and other processes.

In addition, pacing signals and various other signals may be conveyed from the console 24 through the cable 34 (and the catheter 14) and the electrodes 32, 33 to the heart 12, through the switching system 100. Many configurations of the electrodes 32, 33 are possible. For example, the ablation electrode 32 may be disposed at the distal tip 18. The console 24 typically contains one or more ablation power generators 25 for generating the ablation signals.

The positioning processor 22 is an element of a positioning system 26 of the system 10 that measures location and orientation coordinates of the catheter 14. In one example, the positioning system 26 comprises a magnetic position tracking arrangement that determines the position and orientation of the catheter 14 by generating magnetic fields in a predefined working volume its vicinity and sensing these fields at the catheter 14 using field generating coils 28, and may include impedance measurement, as taught, for example, in U.S. Patent Application Publication 2007/0060832. The positioning system 26 may be enhanced by position measurements using the impedance measurements described in the above-noted U.S. Pat. No. 7,536,218. In such position tracking arrangements, wire connections 35 link the console 24 with body surface electrodes 30.$ As noted above, the catheter 14 is coupled to the console 24, which enables the operator 16 to observe and regulate the functions of the catheter 14. Console 24 includes a processor 24x (FIG. 2), which can be a computer with appropriate signal processing circuits. The processor 24x is coupled to drive a monitor 29. The signal processing circuits in the console 24 typically receive, amplify, filter and digitize the received acquired or raw analog signals, processed by and transmitted from the switch unit 110. The analog signals output by switch unit 110 are received and used by the console 24 and the positioning system 26 to compute the position and orientation of the catheter 14 and to analyze the electrical signals from the electrodes 32, 33.

At times during the procedure, such as abnormality in the procedure or stoppage of the heartbeat, as detected automatically by the system 10, or manually by the physician 16, the physician 16 may have to initiate the generation of pacing signals. The pacing signals are transmitted from the console 24 to the heart 12 over the same bidirectional line 200, represented by the cable 34, as the acquired signals. The pacing signals are triggered by the physician 16 on demand, for example, (by the physician 16 activating a pacing signal generator 24y (FIG. 2) in the console 24. This activation may, for example, include the physician 16 pressing a button or other similar structure (not shown), for example, on the console 24 (or on a device in communications with the console 24), which communicates with the pacing signal generator 24y, to activate the pacing signals.

Switching System Description

Figure 2:
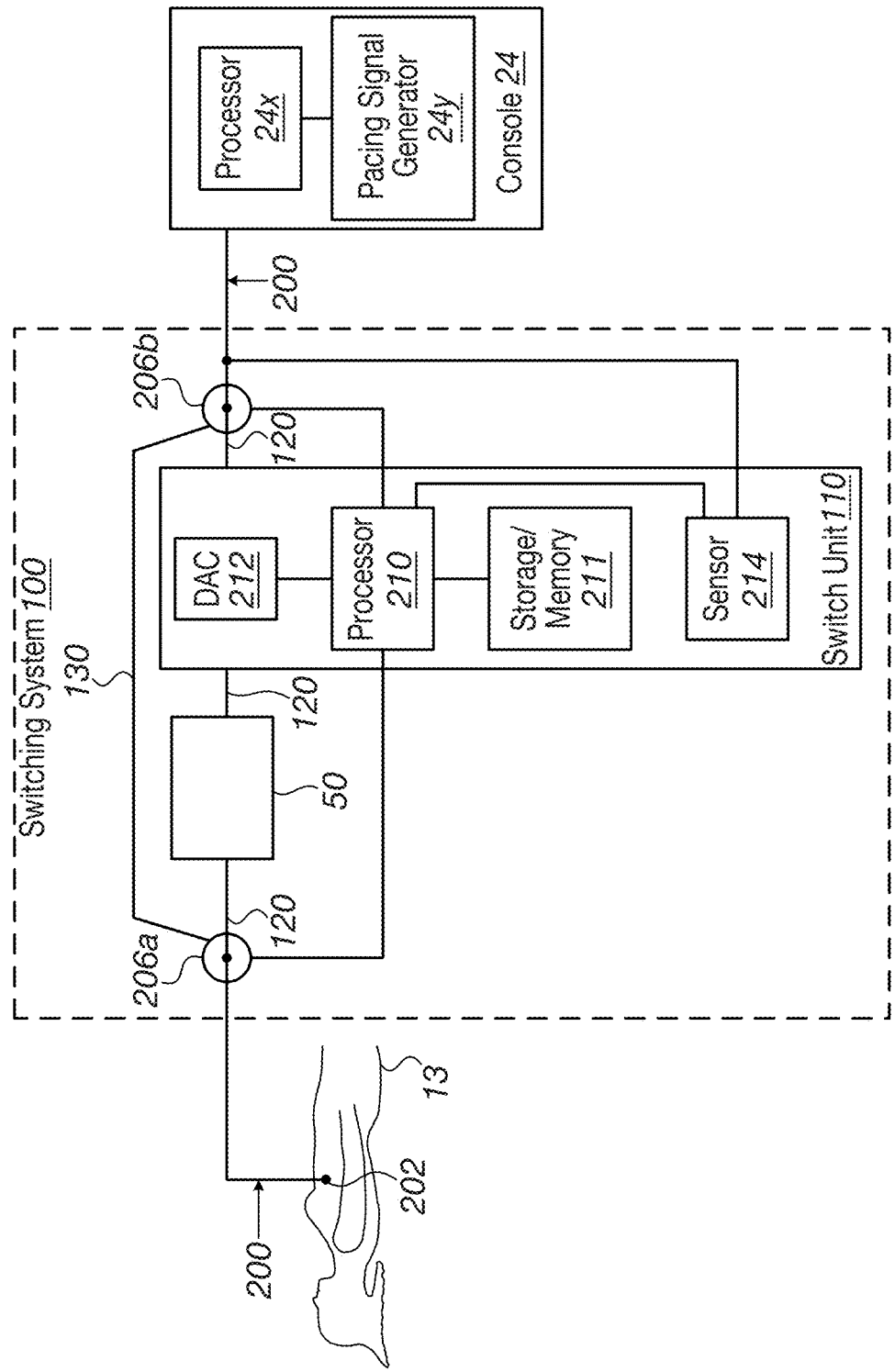
FIG. 2 is a diagram of a switching system in an example use with the cardiac system of FIG. 1, in accordance with the present disclosure.

FIG. 2 shows the switching system 100 (represented by the broken line box), in accordance with an example of the present disclosure. The switching system 100 includes the switch unit 110, which is positioned along a bidirectional signal carrying line 200, also known as a bidirectional line. The bidirectional line 200, is, for example, a single physical line, extending from an electrode 202 (in communication with the heart 12 of the patient 13) to the console 24, also known as an external console. The electrode 202 is representative of the multiple electrodes including those detailed above (e.g., electrodes 32, 33), and the console 24. The bidirectional line 200 includes the main line 120, which extends through the switch unit 110, and the bypass line 130.

The console 24 includes a processor 24x, also known as an operations processor, for receiving and analyzing received signals from the bidirectional line 200, including the main line 120. The console 24, for example, also includes a pacing signal generator 24y, which is typically in communication with the processor 24x, and which may be manually triggered by the physician 16. The generated pacing signals are transmitted to the bidirectional line 200 to the electrode 202, via the bypass line 130, as detailed below.

Switches 206a, 206b are, for example, positioned at the junctions of the main line 120 and the bypass line 130, beyond the switch unit 110, along the bidirectional line 200. The switches 206a, 206b are configured to operate by changing their states to the same state together, in unison, and at the same time, for example, contemporaneously or simultaneously.

The switches 206a, 206b switch between states which, include, for example, a first state, where the main line 120 is enabled, activated/active, open or connected (these terms used interchangeably herein), and the bypass line 130 is disabled, deactivated or disconnected (these terms used interchangeably herein), and, a second state, where the bypass line 130 is enabled, activated/active, open, or connected (these terms used interchangeably herein), and the main line 120 is disabled, deactivated or disconnected (these terms used interchangeably herein). For example, the first state may be the default state for the switches 206a, 206b.

When the switches 206a, 206b are in the first state, the main line 120 is enabled, and the acquired signals travel from the electrode 202 to the console 24, via the switch unit 110. The acquired signals are typically processed in the switch unit, as detailed herein. While the main line 120 is enabled, the bypass line 130 is disabled or otherwise disconnected. Conversely, when the switches 206a, 206b are in the second state, the bypass line 130 is enabled or otherwise connected, and carries the pacing signals to the electrode 202 directly from the console 24, thus bypassing the switch unit 110. The main line 120 is disabled or otherwise disconnected, such that acquired or raw signals are cut off from traveling over the bidirectional line 200.

The switches 206a, 206b may be either mechanical switches, or solid-state switches. Mechanical switches switch by physically moving or "toggling" between positions corresponding to the first and second states, respectively. Solid-state switches switch by electronically changing settings or resetting, the settings corresponding to the respective first and second states.

The switch unit 110 includes a processor 210, also known as a switch unit processor, associated storage media 211, a digital to analog converter (DAC) 212 and a sensor 214, both of which communicate with a processor 210. The processor 210 communicates with the switches 206a, 206b over wired links. The switch unit 110 may include other components, such as filters and/or amplifiers for filtering and/or amplifying the signals after digital-to-analog conversion, in addition to the components described herein, depending on the signal processing that the switch unit 110 is to perform.

The processor 210 includes one or more processors and may be a microcontroller or a central processing unit (CPU).

The processor 210 is programmed to control the state of the switches 206a, 206b, switching the switches 206a, 206b when appropriate, in response to signals received from the sensor 214.

The storage/memory 211 (which in some examples is an internal memory of processor 210) stores machine executable instructions for execution by the processor 210. The storage/memory 211 also includes storage media for temporary storage of data. The storage/memory 211 also includes machine executable instructions associated with the operation of the DAC 212 and the sensor 214.

The DAC 212 converts digital signals, such as the acquired or raw signals, received over the main line 120 of the bidirectional line 200, from the electrode 202, into analog signals. The now-converted analog signals are transmitted to the console 24, over the main line 120 of the bidirectional line 200.

The sensor 214 includes a detector, which, for example, detects analog pacing signals. The detector is positioned along the main line 120, typically intermediate the console 24 and the switch unit 110, and for example, intermediate the console 24 and the switch 206b. The sensor 214 and detector are collectively referred to hereinafter as the "sensor", and represented by element number 214.

For example, the sensor 214 operates by continuously monitoring the main line 120 of the bidirectional line 200 for pacing signals, and instantaneously reporting any detected pacing signals to the processor 210. The detection of the pacing signals, as reported to and obtained by the processor 210, allows the processor 210 to take action by signaling the switches 206a, 206b to change (switch) their states, from the first state to the second state, to enable the bypass line 130, or alternately, maintain the switches 206a, 206b at the second state, to keep the bypass line 130 enabled, should the switches 206a, 206b already be at the second state.

For example, once a pacing signal is detected in the switching system 100 by the switching unit 110, the switching system 100 disconnects or otherwise disables the main line 120 over which the acquired or raw signals travel from the heart 12 to the console 24, through the switch unit 110. The disconnecting is immediate, e.g., instantaneously, and is immediately, e.g., instantaneously followed by the switching unit 110, enabling or otherwise connecting (opening) a bypass line 130, over which the pacing signals travel. The pacing signals travel directly over the bypass line 130, from the console 24 to the electrodes at the heart 12. As a result of the now-enabled bypass line 130, the pacing signals bypass and thus avoid the switch unit 110, and signals travel over the bypass line 130 directly to catheter 14, bypassing switching unit 110 entirely.

System Operation

Figure 3A:
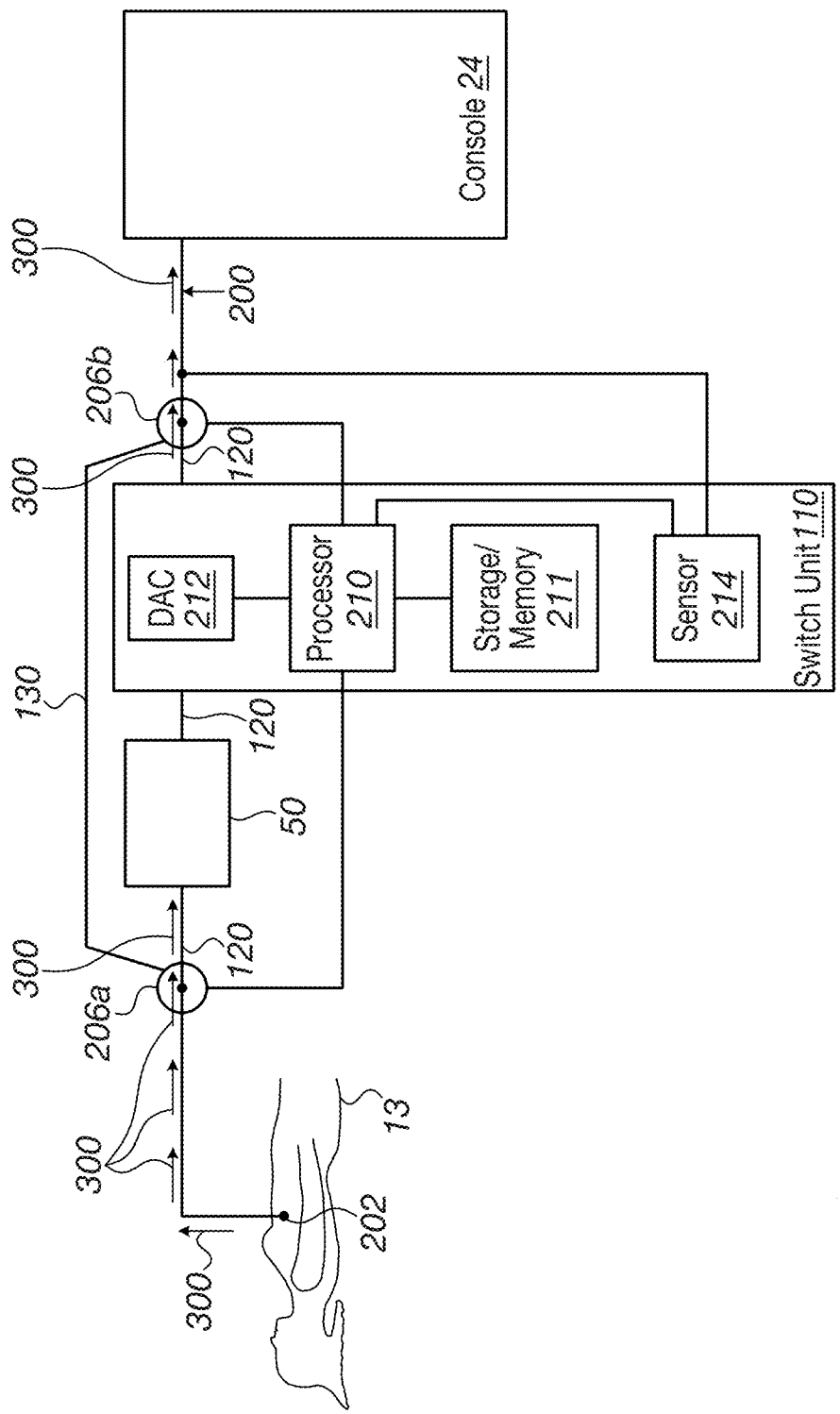
FIG. 3A is a diagram of the switching system in an example use with the cardiac system of FIG. 1, where acquired electrocardiac signals are passing from a patient to a console.
Figure 3B:
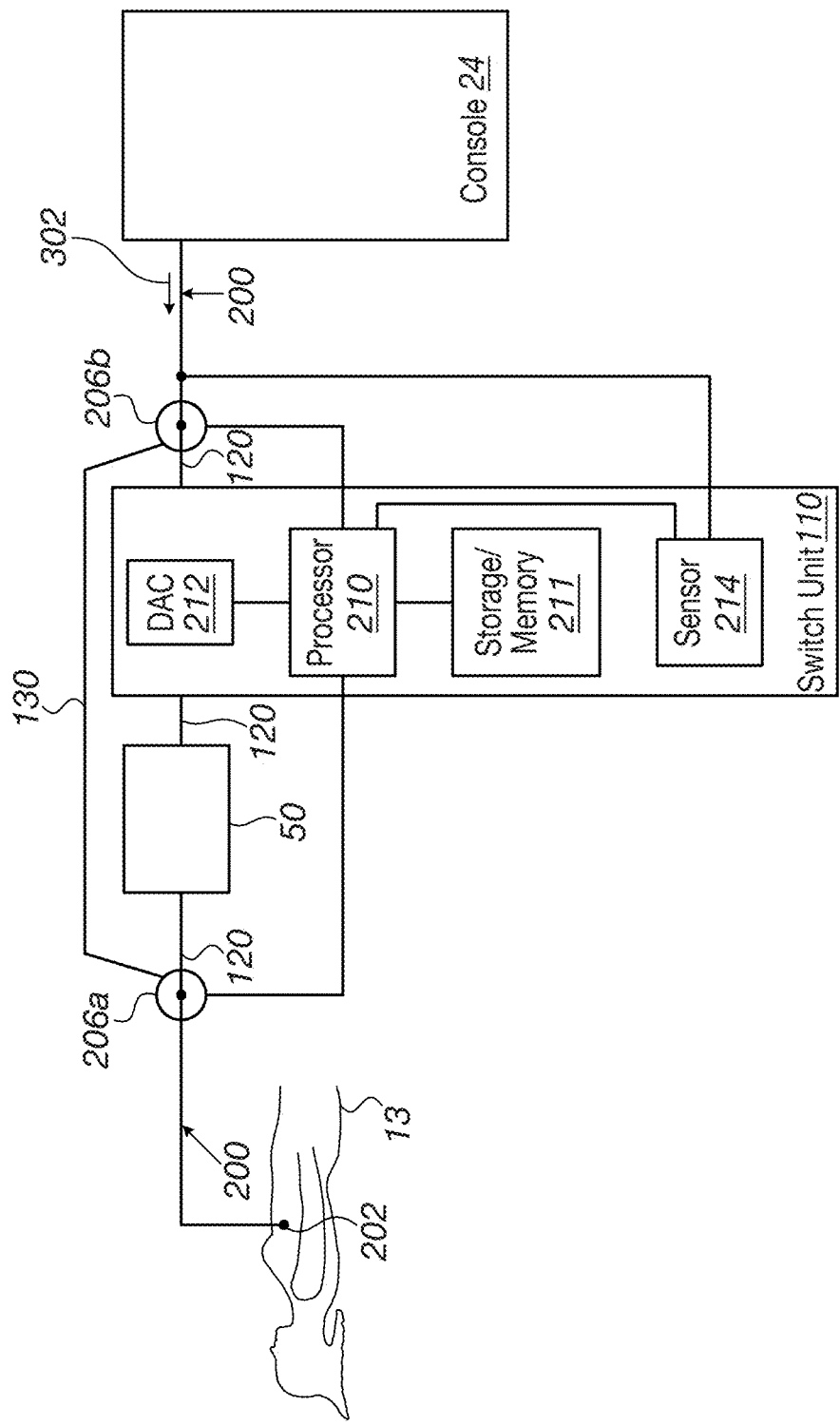
FIG. 3B is a diagram of the switching system in an example use with the cardiac system of FIG. 1, where acquired electrocardiac signals are passing from the patient to the console, and the switching system has detected a pacing signal.
Figure 3C:
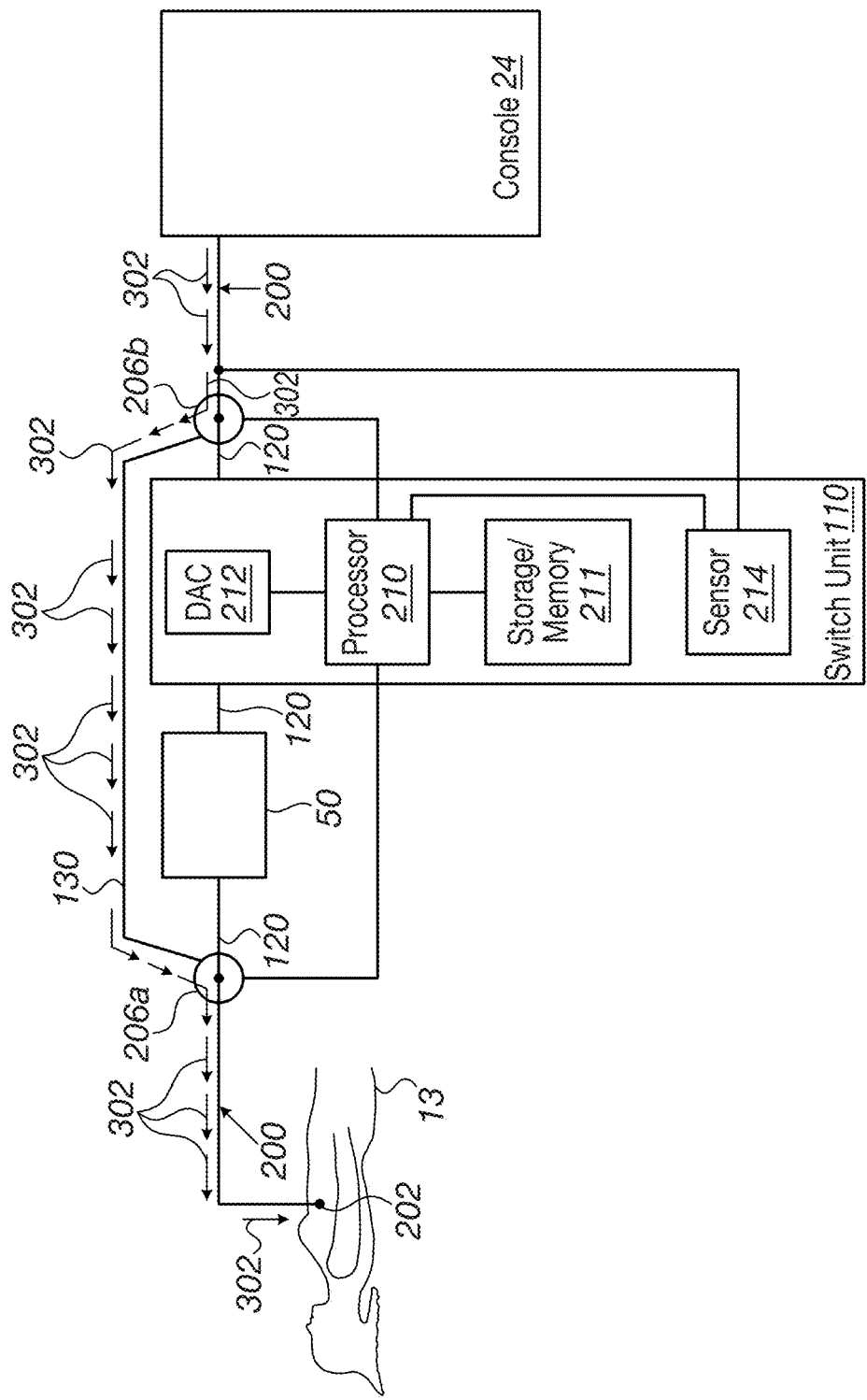
FIG. 3C is a diagram of the switching system in an example use with the cardiac system of FIG. 1, where pacing signals are being transmitted from the console to the patient.

Attention is now directed to FIGS. 3A, 3B and 3C, which illustrate example operations for the switching system 100.

FIG. 3A illustrates operation of the switching system 100, where acquired signals 300 are traveling from the electrode 202 to the console 24, through the switch unit 110, over the main line 120 of the bidirectional line 200. The switches 206a, 206b are in the first state, such that the main line 120 of the bidirectional line 200 is enabled and open, to allow the aforementioned signal 300 flow. As the acquired signals are, for example, digital signals (as obtained from the electrode 202 by an analog to digital converter of the PIU (50) associated and in communication with the electrode 202 along the bidirectional line 200 portion proximate to the electrode 202), these digital signals are processed in switch unit 110, by at least being converted to analog signals, by the DAC converter 212.

In FIG. 3B, pacing signal generation and transmission has been started or initiated by the physician 16 (for example, pressing a button on the console 24 or on a device in communications with the console 24 to activate the pacing signal generator 24y). The pacing signals 302 are generated by a generator 24y in the console 24 and transmitted by a transmitter (not shown) in the console 24, over the bidirectional line 200. The pacing signals 302 are, for example, analog signals, which once triggered at the console 24, are to immediately reach the patient 13 via the electrode 202 (traveling over an uninterrupted electrical connection in the bidirectional line 200). In this figure, the pacing signals 302 are detected by the sensor 214. The sensor 214 signals the processor 210 that pacing signals 302 have been detected in the bidirectional line 200. The processor 210 responds to these received signals, by signaling the switches 206a, 206b, to switch from the first state, to the second state, enabling or opening the bypass line 130 of the bidirectional line 200.

As shown in FIG. 3C, with the bypass line 130 enabled, the pacing signals 302 travel directly from the console 24 to reach the electrode 202, bypassing the switch unit 110. The switching to the bypass line 130 has caused the switches 206a, 206b to switch, resulting in the disabling or otherwise disconnecting of the main line 120 of the bidirectional line 200, such that acquired signals are cut off from flowing through the main line 120 of the bidirectional line 200.

As the pacing signals 302 continue to be generated by the console 24, and are detected by the and the sensor 214, the sensor 214 continues to signal the processor 210 of the presence of the pacing signals 302. In response, the switches 206a, 206b are maintained in the second state, where the bypass line 130 remains enabled and open, allowing the pacing signals to travel directly from the console 24 to the electrode 202.

Once the pacing signals 302 are no longer detected by the sensor 214, for example, for a predetermined amount of time, the sensor 214 signals this condition to the processor 210. The processor 210 responds by signaling the switches 206a, 206b to switch from the second state to the first state, where the main line 120 is again enabled, and the bypass line 130 is disabled or disconnected, as shown, for example, in FIG. 3A.

Figure 4:
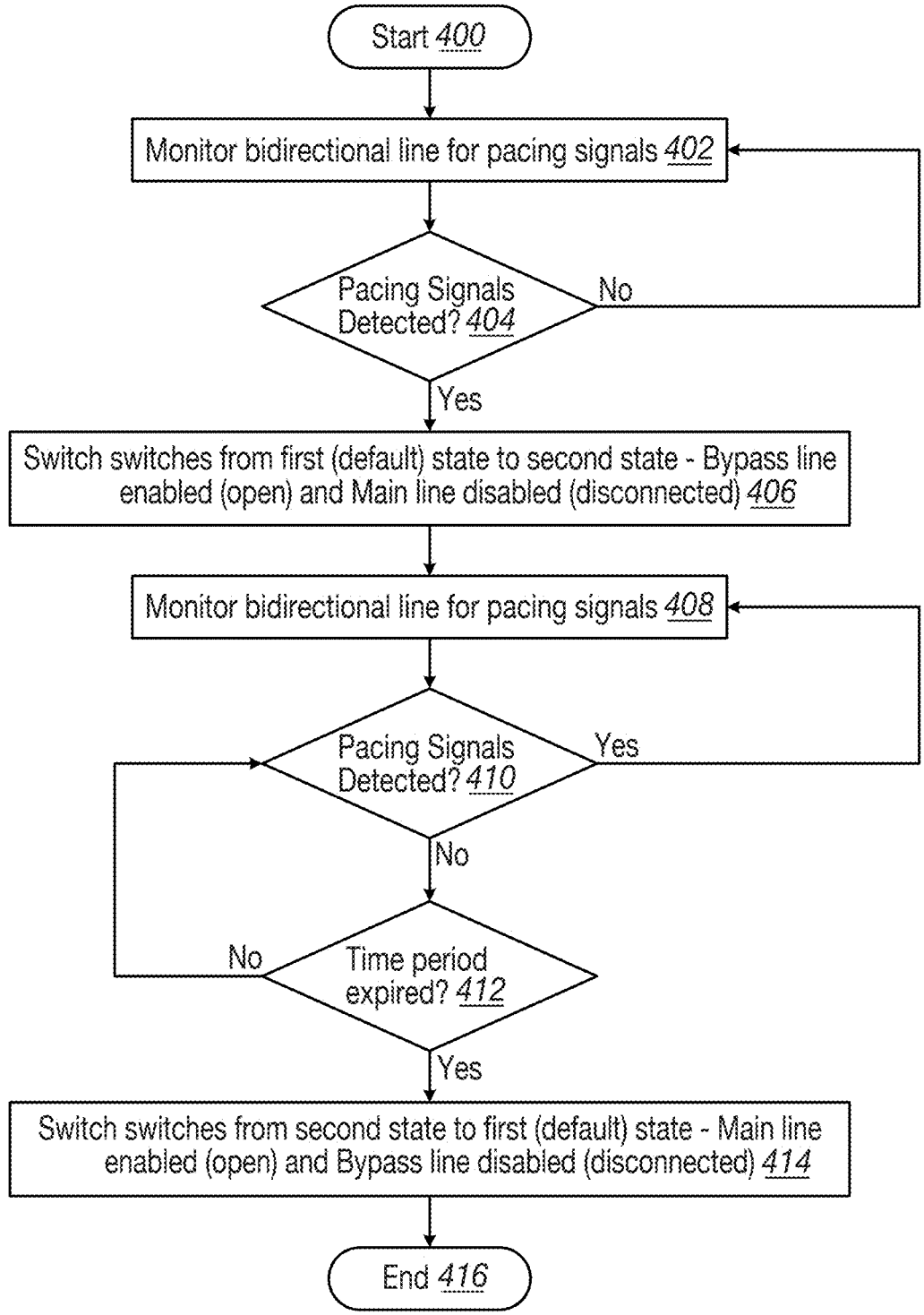
FIG. 4 is a flow chart that schematically illustrates an exemplary operational process performed by the switching system of FIGS. 2 and 3A-3C, in accordance with an example of the present disclosure.

FIG. 4 is a flow diagram of an example process performed by the switching system 100. The example process allows for the immediate transmission of pacing signals, upon being manually triggered or activated by the physician 16. The pacing signals are generated at a console 24 and transmitted to an electrode 202 at the catheter 14 at the patient's heart 12. Once the pacing signals are no longer being transmitted, the switching system 100 reverts to its previous state, prior to the pacing signals having been detected. In this process, reference is made to the switching system 100 elements, as described above. The process is, for example, performed automatically and in real time, and may include manual subprocesses. The process may be performed for as long as desired.

The process begins at a START block 400, where the switches 206a, 206b, are in the first state, which is also the default state here, as shown, for example, in FIG. 3A. Here, the digital to analog converter of the PIU (50) associated with the electrode 202 is transmitting acquired signals (obtained by the electrode 202) to the console 24, via the switch unit 110, over the enabled main line 120 of the bidirectional line 200. The acquired signals, upon reaching the switch unit 110 are processed, for example, by being converted to analog signals, by the DAC 212. During the transmission of the acquired signals, the bypass line 130 is disabled and disconnected.

The process moves to block 402, where the sensor 214 monitors the bidirectional line 200, proximate to the console 24 for pacing signals, transmitted from the console 24. The monitoring is, for example, continuous.

The process moves to block 404, where the sensor 214 determines whether pacing signals are detected. If no, the sensor 214, for example, does not signal the processor 210, and the switch 206a, 206b state is maintained in the first or default state. The process returns to block 404, from where it resumes.

However, at block 404, should the sensor 214 detect pacing signals in the bidirectional line 200, which are, for example, traveling from the console 24 toward the switch unit 110, as shown, for example, in FIG. 3B, the sensor 214 signals this information to the processor 210. The processor 210 signals the switches 206a, 206b to instantaneously change (switch) states, from the first state, to the second state, at block 406, and as shown, for example, in FIG. 3C. With the switches 206a, 206b now in the second state, the bypass line 130 is immediately enabled or open, and pacing signals are transmitted directly from the console 24 to the electrode 202, avoiding the switch unit 110.

The process moves to block 408, where the sensor 214 monitors the bidirectional line 200, proximate to the console 24 for pacing signals, transmitted from the console 24. The monitoring is, for example, continuous.

The process moves to block 410, where it is determined, by the sensor 214, whether pacing signals are being transmitted (and generated) from the console 24. If yes, the process returns to block 408, from where it resumes. The switch 206a, 206b state at the second state is maintained.

If no at block 410, pacing signals are not being detected, and the process moves to block 412. At block 412, the processor 210 determines whether pacing signals have not been detected for a predetermined time period. For example, the processor 210 may not have received any signals from the sensor 214 indicating the detection of pacing signals. If no at block 412, the time period has not expired, and the process moves to block 410, from where the process resumes.

At block 412, should the time period have expired, the process moves to block 414, where the processor 210 signals the switches 206a, 206b to change (switch) from the second state to the first state, which is, for example, the default state. This switching returns the switching system 100 to its previous or default state, as the pacing signals are no longer being transmitted, and the main line 120 is again enabled, for carrying the acquired signals, from the electrode 202 to the console 24, via the switch unit 110, shown, for example, in FIG. 3A.

From block 414, the process moves to block 416, where it ends. The process may be repeated as desired.

Although the examples described herein mainly address switching in electrocardiac signal and pacing signal carrying lines, the methods and systems described herein can also be used in other switching applications.

The aforementioned disclosed subject matter may, for example, also be in the form of a computer software product. The product comprises, for example, a tangible non-transitory computer-readable medium in which program instructions are stored, which instructions, when read by a processor 210, cause the processor 210 to signal switches 206a, 206b to switch to the same state together, in order to enable and open a bypass line 130 in a bidirectional line 200, such that pacing signals may be transmitted directly from the console 24 to the electrode, rapidly and efficiently, upon being triggered or otherwise activated manually by the physician 16. The bypassing of the switch unit 110 avoids any processing delays in the switch unit 110. During the time the bypass line 130 is enabled or open, the main line 120, over which acquired signals travel from the electrode 202 to the console 24, is disabled and disconnected.

EXAMPLES

Example 1

A switching system (100) for use in a cardiac procedure on a subject (13). The switching system comprises: a switch unit (110) for communicating with a bidirectional line (200), the bidirectional line (200) configured for extending from an electrode (202) at the heart (12) of the subject (13) to an external console (24). The bidirectional line (200) comprises: a main line (120), extending through the switch unit (110), for carrying signals comprising acquired signals from the electrode (202) to the external console (24); and, a bypass line (130), extending outside of the switch unit (110) for carrying signals comprising pacing signals from the external console (24) to the electrode (202). The switching system (110) also comprises: a first switch (206a) and a second switch (206b) each in communication with the switch unit (110), each of the first switch (206a) and the second switch (206b) in communication with the main line (120) and the bypass line (130), the first switch (206a) and the second switch (206b) changeable between: 1) a first state, where the main line (120) is enabled for carrying the acquired signals, and the bypass line (130) is disabled, and, 2) a second state, where the bypass line (130) is enabled for carrying the pacing signals and the main line (120) is disabled.

Example 2

The switching system (100) of Example 1, wherein the first switch (206a) and the second switch (206b) are configured for switching together between the first state and the second state.

Example 3

The switching system (100) of any of Example 1 or Example 2, wherein the switch unit (110) comprises: at least one switch unit processor (210) in communication with the first switch (206a) and the second switch (206b), the switch unit processor (210) programmed to signal the first switch (206a) and the second switch (206b) to: change the state, between the first state and the second state, or, maintain the state at the first state or the second state.

Example 4

The switching system (100) of any of Example 1 to Example 3, wherein the switch unit (110) additionally comprises: a sensor (214) in communication with the switch unit processor (210), the sensor (214) configured for sensing at least the presence of detected pacing signals on the bidirectional line (200) proximate to the external console (24), and to indicate the detected pacing signals to the switch unit processor (210), causing the switch unit processor (210) to signal the first switch (206a) and the second switch (206b) to change the state, between the first state and the second state, or maintain the state, at the first state or the second state.

Example 5

The switching system (100) of any of Example 1 to Example 4, wherein the first switch (206a) and the second switch (206b) are along the bidirectional line (200) beyond the switch unit (110).

Example 6

The switching system (100) of any of Example 1 to Example 5, wherein the first switch (206a) and the second switch (206b) are each at a junction of the main line (120) and the bypass line (130).

Example 7

The switching system (100) of any of Example 1 to Example 6, wherein the first switch (206a) and the second switch (206b) both comprise either mechanical switches or solid-state switches.

Example 8

The switching system (100) of any of Example 1 to Example 7, wherein the switch unit (110) additionally comprises: a digital to analog signal converter (DAC) (212) in communication with the main line (120) of the bidirectional line (200).

Example 9

A method for switching signals carried along a bidirectional line (200) between an electrode (202) at the heart (12) of a patient (13) and an external console (24). The method comprises: providing a switching system (100) along the bidirectional line (200). The switching system (100) comprises: a switch unit (110) for communicating with the bidirectional line (200), the bidirectional line (200) configured for extending from the electrode (202) at the heart (12) of the patient (13) to the external console (24). The bidirectional line (200) comprises: a main line (120), extending through the switch unit (110), for carrying signals comprising acquired signals; and, a bypass line (130), extending outside of the switch unit (110) for carrying signals comprising pacing signals. The switching system (100) also comprises: a first switch (206a) and a second switch (206b) each in communication with the switch unit (110), each of the first switch (206a) and the second switch (206b) in communication with the main line (120) and the bypass line (130), the first switch (206a) and the second switch (206b) changeable between: 1) a first state, where the main line (120) is enabled for carrying the acquired signals, and the bypass line (130) is disabled, and, 2) a second state, where the bypass line (130) is enabled for carrying the pacing signals and the main line (120) is disabled. The method also comprises: detecting at least one pacing signal along a portion of the bidirectional line (200) proximate to the external console (24); and, in response to the detected at least one pacing signal, changing the state of the first switch (206a) and the second switch (206b) from the first state to the second state.

Example 10

The method of Example 9, wherein the response to the detected at least one pacing signal includes maintaining the first switch (206a) and the second switch (206b) at the second state if the existing state is the second state.

Example 11

The method of Example 9 or Example 10, wherein the first switch (206a) and the second switch (206b) are maintained at the second state until the at least one pacing signal is not detected for a predetermined time period.

Example 12

The method of any of Example 9 to Example 11, wherein, the state of the first switch (206a) and the second switch (206b) are changed from the second state to the first state when the at least one pacing signal is not detected for at least a predetermined time period.

Example 13

The method of any of Example 9 to Example 12, wherein the detecting the at least one pacing signal is by at least one sensor (214).

Example 14

The method of any of Example 9 to Example 13, wherein at least a portion of the at least one sensor (214) is in communication with the bidirectional line (200) portion proximate to the external console (24).

Example 15

The method of any of Example 9 to Example 14, wherein the response to the detected at least one pacing signal, includes at least one processor (210) receiving at least one signal that the at least one pacing signal has been detected, and the at least one processor (210) signaling the first switch (206a) and the second switch (206b) to change the state of the first switch (206a) and the second switch (206b) from the first state to the second state.

Example 16

The method of any of Example 9 to Example 15, wherein the detecting the at least one pacing signal along the bidirectional line (200) portion proximate to the external console (24) includes monitoring the bidirectional line (200) portion.

Example 17

The method of any of Example 9 to Example 16, wherein the monitoring is continuous.

Example 18

The method of any of Example 9 to Example 17, wherein the first switch (206a) and the second switch (206b) are changeable between the first state and the second state comprising: the first switch (206a) and the second switch (206b) switching together between the first state and the second state.

It will thus be appreciated that the examples described above are not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A switching system providing bidirectional communication between one or more electrodes at a distal end of a catheter and an external console, the system comprising:

a patient interface unit (PIU) configured to sample electrocardiac signals sensed by the one or more electrodes;

a switch unit configured to convert the electrocardiac signals sampled by the PIU to an analog signal:

a bi-directional line comprising:

a main line configured to transmit analog signals from the one or more electrodes to the external console via the PIU and switch unit; and a bypass line configured to bypass the PIU and switch unit and thereby directly communicate analog signals between the one or more electrodes and the external console; and a pair of switches configured to toggle between communicating the analog signals via the main line and via the bypass line;

wherein the switch unit comprises:

a digital to analog converter configured to convert the electrocardiac signals sampled by the PIU to an analog signal;

a sensor configured to sense a pacing signal generated by the external console and transmitted over the main line, wherein the pacing signal is configured to be delivered to the one or more electrodes; and a processor configured to:

operate said pair of switches for toggling between the main line and the bypass line based on output from said sensor; and process the electrocardiac signal sampled from the PIU that is received via the main line.

2. The switching system according to claim 1, wherein the processor is configured to toggle the pair of switches to activate the bypass line and de-activate the main line between the electrodes and the switch unit based sensing the pacing signal.

3. The switching system according to claim 2, wherein the processor is configured to toggle the pair of switches to activate the main line and de-activate the bypass based on detecting that no pacing signals have been sensed by the sensor for a pre-defined time period of time.

4. The switching system according to claim 1, wherein the bypass line is a bidirectional line providing bidirectional communication between the one or more electrodes at a distal end of a catheter and the external console.

5. The switching system according to claim 1, wherein each of the main line and the bypass line is configured to transmit the analog signals collected by the one or more electrodes to the external console for display on a display screen.

* * * * *